US008660252B2

(12) United States Patent
Mateos Perez et al.

(10) Patent No.: US 8,660,252 B2
(45) Date of Patent: Feb. 25, 2014

(54) CONTROL OF EXECUTION TIME OF TIME-DEPENDENT SERVICES BY DEFINING DIFFERENT TIME ZONES FOR THE SUBSCRIBER'S LOCATION, THE EXECUTION SERVER, AND THE SERVICE SUBSCRIPTION INFORMATION

(75) Inventors: Daniel Mateos Perez, Getafe (ES); Santiago Muñoz Muñoz, Madrid (ES); Jesus Solana Gonzalez, Madrid (ES); Julio Vega Arnaez, Majadahonda (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 7 days.

(21) Appl. No.: 13/516,387

(22) PCT Filed: Dec. 18, 2009

(86) PCT No.: PCT/IB2009/007824
§ 371 (c)(1),
(2), (4) Date: Jun. 15, 2012

(87) PCT Pub. No.: WO2011/073711
PCT Pub. Date: Jun. 23, 2011

(65) Prior Publication Data
US 2012/0257738 A1    Oct. 11, 2012

(51) Int. Cl.
*H04M 3/42*    (2006.01)
(52) U.S. Cl.
USPC .................................................... 379/207.03
(58) Field of Classification Search
USPC .................................................... 379/207.03
See application file for complete search history.

(56) References Cited

U.S. PATENT DOCUMENTS

| 6,097,945 | A | 8/2000 | Evensen et al. |
| 2003/0073428 | A1 | 4/2003 | Yamamoto |
| 2006/0003766 | A1 | 1/2006 | Parameswar et al. |
| 2006/0252438 | A1 | 11/2006 | Ansamaa et al. |

(Continued)

FOREIGN PATENT DOCUMENTS

| EP | 1906638 | 4/2008 |
| EP | 1916832 | 4/2008 |
| WO | WO 98/06212 | 2/1998 |
| WO | WO 01/82638 | 11/2001 |

OTHER PUBLICATIONS

International Search Report for PCT/IB2009/007824 mailed Sep. 28, 2010.

(Continued)

*Primary Examiner* — Quynh Nguyen
(74) *Attorney, Agent, or Firm* — Nixon & Vanderhye, P.C.

(57) ABSTRACT

A data layered architecture (DLA) system includes a front end (FE) server and a common directory (CD). The FE server includes a processing unit which defines an FE time zone (FETZ) based on the FE server's geographical location and that defines a current date and time of the FETZ. The FE server includes a network interfacing unit which obtains from the CD through the network a subscriber default time zone (SDTZ), a subscriber service time zone (SSTZ), a service activation date (SAD) and a service activation time (SAT). The processing unit selects as service time zone (STZ) for executing the service the SSTZ, if a valid SSTZ exists, or the SDTZ, if a valid SSTZ does not exist, or the FETZ, if a valid SDTZ does not exist. Furthermore, the processing unit only executes the service after checking that the SAD and SAT of the STZ correspond to the current date and time of the FETZ.

16 Claims, 7 Drawing Sheets

(56) References Cited

U.S. PATENT DOCUMENTS

2008/0139202 A1  6/2008  Wang et al.
2009/0104899 A1  4/2009  Bakker et al.
2009/0290571 A1  11/2009  Margolis

OTHER PUBLICATIONS

International Preliminary Report on Patentability dated Apr. 26, 2012.

CONTROL OF EXECUTION TIME OF TIME-DEPENDENT SERVICES BY DEFINING DIFFERENT TIME ZONES FOR THE SUBSCRIBER'S LOCATION, THE EXECUTION SERVER, AND THE SERVICE SUBSCRIPTION INFORMATION

This application is the U.S. national phase of International Application No. PCT/IB2009/007824 filed 18 Dec. 2009 which designated the U.S. the entire conents of each of which are hereby incorporated by reference.

TECHNICAL FIELD

The present invention is related to time calculation for time dependent services. (As used herein, references to the "present invention" or "invention" relate to exemplary embodiments and not necessarily to every embodiment encompassed by the appended claims.) More specifically, the present invention is related to time calculation for time dependent services in a Data Layered Architecture where execution of time dependent services involves more than one entity, and wherein each entity is located in a different time zone.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The present invention generally relates to telecommunication services which execution depends on time and date. More particularly, the invention relates to those services which execution involves more than one entity, wherein each entity is located in a different time zone.

Conventional telecommunication networks are generally provided with a subscriber database storing all relevant subscriber data, including service data per subscriber, for all the subscribers of a particular network operator. In conventional mobile networks, any subscriber may at a certain time be roaming far away from the subscriber database holding the subscriber data for said subscriber.

Nowadays, there are services that can be invoked by the subscribers, or triggered by a network entity, and wherein this invocation or trigger may depend on date or time of the day, namely, time-dependent services. Regarding the execution of these time-dependent services, especially where the subscriber is roaming in an area located in a different time zone than the time zone where the subscriber database or other network entities are located, the service may be executed at an unexpected time. In this field of application, US 2006/0252438 teaches a method for determining the time zone where the user's equipment is located in order to apply this time zone for execution of time dependent services for this subscriber. This teaching may be appropriate for services such as, for example, conditional call forwarding services depending on time of the day; however, other services such as IMSI Changeover, for example, may better depend on the time zone of the operator's infrastructure.

Moreover, current trends in dedicated database systems point out for a separation of application logic and subscriber data in different physical network elements: Front Ends in charge of the application logic and Directory DB storing the subscriber data. This approach is currently known as Data Layered Architecture (DLA). DLA basically consists of a number of Front-Ends (FE) servers implementing the logic of the application or service, and a Common Directory (CD) database serving as central storage point for subscriber data of HSS, HLR, AUC, MNP, Application Servers, etc.

Where a DLA is utilized as subscriber database, the execution of time dependent services may vary from one network to another depending on different operator's preferences. Since on serving a particular subscriber the DLA includes an FE server and a CD database, on executing a time dependent service for said subscriber there is a need to determine which is the time zone to apply.

Moreover, different operators operating DLA may have different criteria in respect of what time zone should be applied for different time dependent services.

The present invention is aimed, at least, to minimize the above drawbacks and provides a technique to decide on subscriber basis the time zone to be applied for any time dependent service this subscriber can have.

Due to the own nature of Layered Architecture, its components, e.g. HSS-S, AS, etc., are spread across the operator network in several geographical sites. In case of large countries, it may happen that not all components are placed in the same Time Zone. Also, independently of that fact, a subscriber may physically be in a different Time Zone than the server which is giving service to him.

When one traffic or provisioning event occurs, the FE Server (AS, or simply the Server) downloads the service data and checks the date and time stored in the CD database with the date and time of local Server, if they match or the Server one is more recent, then it is executed.

So when the time zone of the time dependant service stored in the Directory DB and the time zone of the Server executing the logic coincide with the time zone where the Subscriber is located, the task is executed exactly at the date and time desired and specified. (Along the document the term subscriber is used. It means the entity using the telephone equipment and the services. Other terms can be user, subscriptions etc.)

The problem occurs when the time zone where the Subscriber is located, the time zone of the Server executing the service, or the time zone of the stored service date and time do not match.

When it happens, what time zone shall be used? The time zone stored for the Service or the Subscriber's time zone or the Server's time zone?

The consequences of wrong time calculation can be uncomfortable for the Subscriber experience. For example a Subscriber has configured a Call Forwarding Unconditional Service with a time range everyday so that all calls received in that period of time are diverted to a voice mailbox, e.g. from 19:00 to 07:00 all received calls are forwarded to the voice mailbox. While the time zones of: the service, the Server, and Subscriber location match the service works fine.

Just when the Server or Subscriber location time zone differs from the configured time zone of the Service, it works weirdly. Let's imagine that the Subscriber moves to a visited network some time zones away from his/her original one, for example the period of time in the new time zone correspond to 14:00 to 02:00. It means that the Subscriber stops receiving call at 2 pm, so important calls can be diverted to voice mailbox. But also the Subscriber begins receiving calls at 2 am, when s/he is still sleeping. So the experience is a bit annoying.

This problem can arise in any type of systems but in distributed systems, where the Server and the Directory DB are different physical components in different geographical locations covering different time zones, it is more evident and even more frequent.

SUMMARY

The present invention pertains to a front end (FE) server of a data layered architecture (DLA) system. The DLA system includes a common directory (CD) of subscriber data in a telecommunications network. The FE server comprises a processing unit which defines an FE time zone (FETZ) based on the FE server's geographical location and that defines a current date and time of the FETZ. The FE server comprises a network interfacing unit which obtains from the CD through the network a subscriber default time zone (SDTZ), a subscriber service time zone (SSTZ), a service activation date (SAD) and a service activation time (SAT). The processing unit selects as service time zone (STZ) for executing the service the SSTZ, if a valid SSTZ exists, or the SDTZ, if a valid SSTZ does not exist. Furthermore, the processing unit only executes the service after checking that the SAD and SAT of the STZ correspond to the current date and time of the FETZ.

The present invention pertains to a method of a FE server of a DLA system. The DLA system includes a CD of subscriber data in a telecommunications network. The method comprises the steps of defining with a processing unit an FETZ based on the FE server's geographical location and a current date and time. There is the step of obtaining with a network interfacing unit from the CD through the network a SDTZ, SSTZ, a SAD and a SAT. There is the step of the processing unit selecting as STZ for executing the service the SSTZ, if a valid SSTZ exists, or the SDTZ, if a valid SSTZ does not exist. Furthermore, there is the step of the processing unit only executing the service after checking that the SAD and SAT of the STZ correspond to the current date and time of the FETZ.

The present invention pertains to a CD of a DLA system. The DLA system includes a FE server in a telecommunications network. The CD comprises a memory which stores a SDTZ, a SSTZ, a SAD and a SAT. The CD comprises a network interfacing unit which sends the SDTZ, the SSTZ, the SAD and the SAT towards the FE.

The present invention pertains to a method of a CD of a data layered architecture (DLA) system. The DLA system includes a FE server of in a telecommunications network. The method comprises the steps of receiving a subscriber profile request from the FE by way of the network at a network interfacing unit. There is the step of sending a SDTZ, a SSTZ, a SAD and a SAT from the interfacing unit to the FE by way of the network.

BRIEF DESCRIPTION OF THE THE DRAWINGS

In the accompanying drawings, the preferred embodiment of the invention and preferred methods of practicing the invention are illustrated in which.

DETAILED DESCRIPTION

Figure 9:
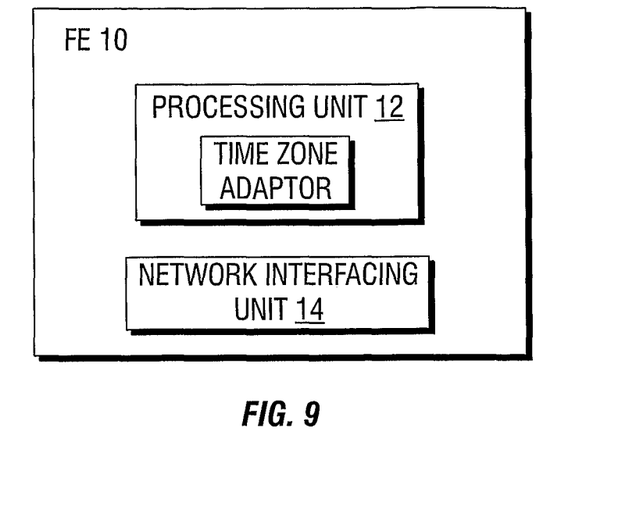
FIG. 9 is a block diagram of a front end server of the present invention.

Referring now to the drawings wherein like reference numerals refer to similar or identical parts throughout the several views, and more specifically to FIG. 9 thereof, there is shown a front end (FE) 10 server of a data layered architecture (DLA) system. The DLA system includes a common directory (CD) 20 of subscriber data in a telecommunications network. The FE 10 server comprises a processing unit 12 which defines an FE time zone (FETZ) based on the FE 10 server's geographical location and that defines a current date and time of the FETZ. The FE 10 server comprises a network interfacing unit 14 which obtains from the CD 20 through the network a subscriber default time zone (SDTZ), a subscriber service time zone (SSTZ), a service activation date (SAD) and a service activation time (SAT). The processing unit selects as service time zone (STZ) for executing the service the SSTZ, if a valid SSTZ exists, or the SDTZ, if a valid SSTZ does not exist. Furthermore, the processing unit 12 only executes the service after checking that the SAD and SAT of the STZ correspond to the current date and time of the FETZ. In particular, such correspondence may be a matching between both dates and times or, for the sake of simplicity, both dates and times belonging to a same time window.

The network interfacing unit 14 may also obtain from the CD 20 through the network a subscriber location time zone (SLTZ) and an override subscriber location flag (OSLFlag) forcing the processing unit to select the SLTZ as service time zone (STZ) for executing the service. The processing unit 12 may recalculate a new SLTZ when there is a new subscriber location time zone and sends it to the CD 20. The network interfacing unit 14 may receive a subscriber procedure request message from a Service Access Element which changes the SSTZ.

The processing unit 12 may include a time zone adaptor for converting the SAD and SAT of the STZ into a corresponding date and time of the FETZ. In such a case, the processing unit 12 only executes the service after checking that the corresponding date and time of the FETZ respectively match the current date and time of the FETZ. Alternatively, the processing unit 12 may include a time zone adaptor for converting the current date and time of the FETZ into a corresponding date and time of the STZ. In such a case, the processing unit 12 only executes the service after checking that the corresponding date and time of the STZ respectively match the SAD and SAT of the STZ.

Figure 10:
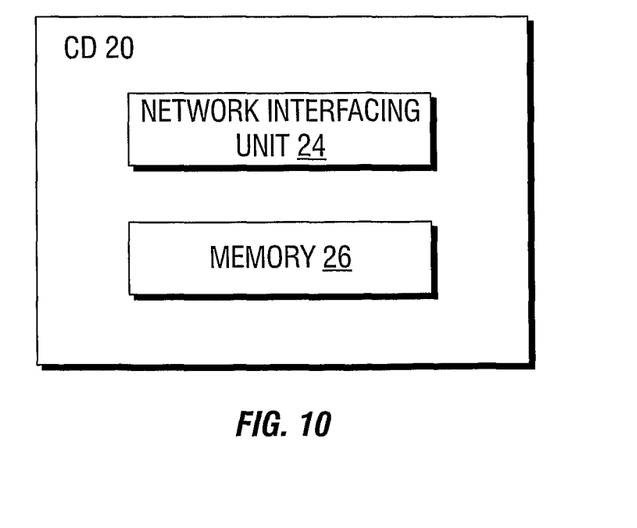
FIG. 10 is a block diagram of a common directory of the present invention.

The present invention pertains to a CD 20 of a DLA system, as shown in FIG. 10. The DLA system includes FE 10 server in a telecommunications network. The CD 20 comprises a memory 26 which stores a SDTZ, a SSTZ, SAD and a SAT. The CD 20 comprises a network interfacing unit 24 which sends the SDTZ, the SSTZ, the SAD and the SAT towards the FE 10. The network interfacing unit 24 may receive a notification from a provisioning gateway which changes at least one of the SSTZ and SDTZ.

The present invention pertains to a method of a FE 10 server of a DLA system. The DLA system includes a CD 20 of subscriber data in a telecommunications network. The method comprises the steps of defining with a processing unit 12 an FETZ based on the FE 10 server's geographical location and a current date and time. There is the step of obtaining with a network interfacing unit 14 from the CD 20 through the network a SDTZ, a SSTZ, a SAD and a SAT. There is the step of the processing unit 12 selecting as service time zone (STZ) for executing the service the SSTZ, if a valid SSTZ exists, or the SDTZ, if a valid SSTZ does not exist. Furthermore, there is the step of the processing unit 12 only executing the service after checking that the SAD and SAT of the STZ correspond to the current date and time of the FETZ.

There may be the step of the network interfacing unit 14 also obtaining from the CD 20 through the network a SLTZ and an OSLFlag forcing the processing unit to select the SLTZ as STZ for executing the service. There may be the steps of the processing unit 12 recalculating a new SLTZ when there is a new subscriber location time zone and sending the new SLTZ from the network interfacing unit to the CD 20. There may be the step of the network interfacing unit 14 receiving a subscriber procedure request message from a Service Access Element which changes the SSTZ.

There may be the steps of: a time zone adaptor converting the SAD and SAT of the STZ into a corresponding date and time of the FETZ, and the processing unit 12 only executing the service after checking that the corresponding date and time of the FETZ respectively match the current date and time of the FETZ. Alternatively, there may be the steps of: the time zone adaptor converting the current date and time of the FETZ into a corresponding date and time of the STZ, and the processing unit 12 only executing the service after checking that the corresponding date and time of the STZ respectively match the SAD and SAT of the STZ.

The present invention pertains to a method of a CD 20 of a DLA system. The DLA system includes a FE 10 server of in a telecommunications network. The method comprises the steps of receiving a subscriber profile request from the FE 10 by way of the network at a network interfacing unit. There is the step of sending a SDTZ, a SSTZ, a SAD and a SAT from the interfacing unit to the FE 10 by way of the network. There may be the step of the network interfacing unit receiving a notification from a provisioning gateway which changes the SSTZ.

The present invention introduces a technique to determine the correct date and time for execution of the time dependent services in a DLA environment. For it, the following data must be defined:

FE 10 servers would define a Time Zone (FETZ) based on their geographical location. Alternatively, the FE 10 server is configured or provisioned with such FETZ.

On subscriber basis and stored in the Common Directory (CD) 20 following Time Zones would be defined:

Subscriber Default Time Zone (SDTZ)
It would be defined as the reference time zone for the subscriber and be set by means of Subscriber or Operator procedures.

Subscriber Service Time Zone (SSTZ)
It would indicate the applicable TZ for the execution of a service.

There could be as many Subscriber Service Time Zones as time related services the subscriber may have. It would be used in case that a different TZ than the default is required for its execution.

It could be set by means of Subscriber or Operator procedures.

Subscriber Location Time Zone (SLTZ)
It would indicate the TZ where the subscriber is located.
It could be obtained in different manners:
Based on the time zone of the server where the Subscriber is currently located or most recently known.
It can be set by means of Subscriber or Operator procedures as described in FIG. 3 and FIG. 4.

It can be set by means of some terminal procedure, for example automatically triggered when the Server TZ is changed.

Override Subscriber Location TZ flag (OSLFlag)
It indicates if the SLTZ must be taken into account or not, and it would be set by means of Subscriber or Operator procedures.

Using the data defined above, the new proposed method will basically behave as follows:

For each service, if a subscriber service TZ (SSTZ) exists, it will be used as Service Time Zone; otherwise, the subscriber default TZ (SDTZ) will apply as Service Time Zone.

Later on, if the Override Subscriber Location TZ flag (OSLFlag) is not set, the Service Time Zone obtained in the previous step will be used, otherwise Subscriber Location (SLTZ) will be used. By default, Override Subscriber Location TZ flag (OSLFlag) is not set.

Finally, the obtained TZ will be checked with the FETZ to verify if the service must be executed.

Figure 1:
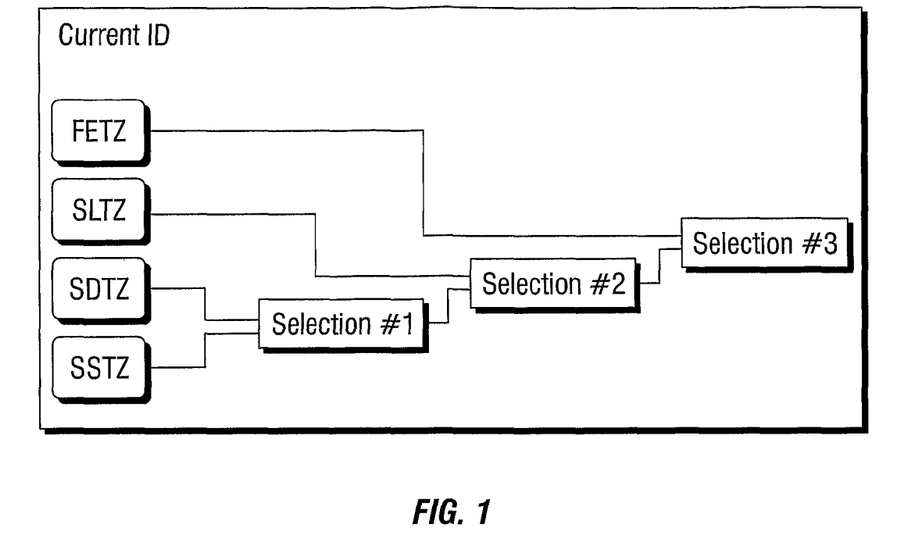
FIG. 1 shows the invention process.

The complete process is shown in FIG. 1.

Service Information

According to the information provided above, the following data would be used for the inventive technique:

FE 10 servers would have a Time Zone (FETZ) based on their geographical location.

Each subscriber would have following data:
SDTZ: reference time zone for the subscriber.
SSTZ: applicable TZ for the execution of a service.
This data might be repeated as many times as related dependent services the subscriber might have.
SLTZ: Time zone where the subscriber is located.
OSLFlag: indicates if the SLTZ must be taken into account or not.

Figure 2:
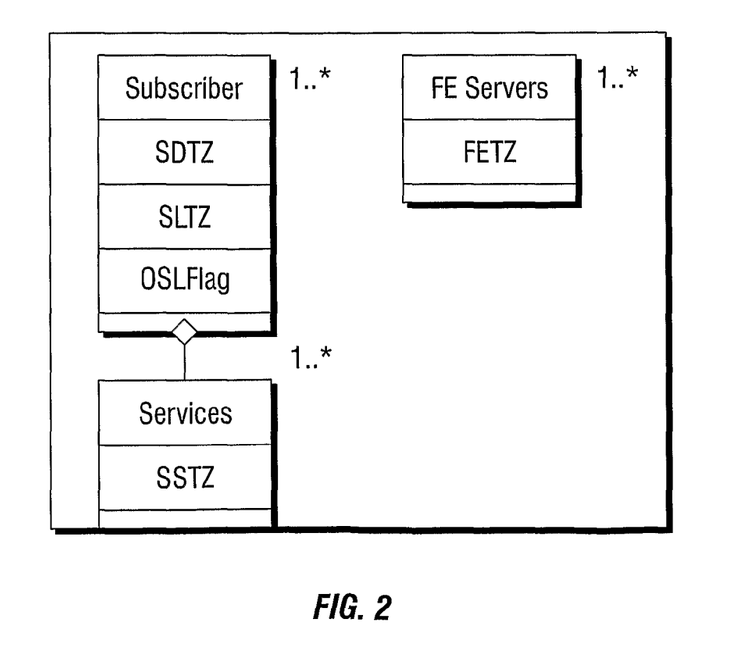
FIG. 2 shows the time zone data.

FIG. 2 shows the time zone data.

Another TZ for the CD 20 could be defined (CDTZ) but it is not really needed for the proposed method.

Service Activation

Figure 5:
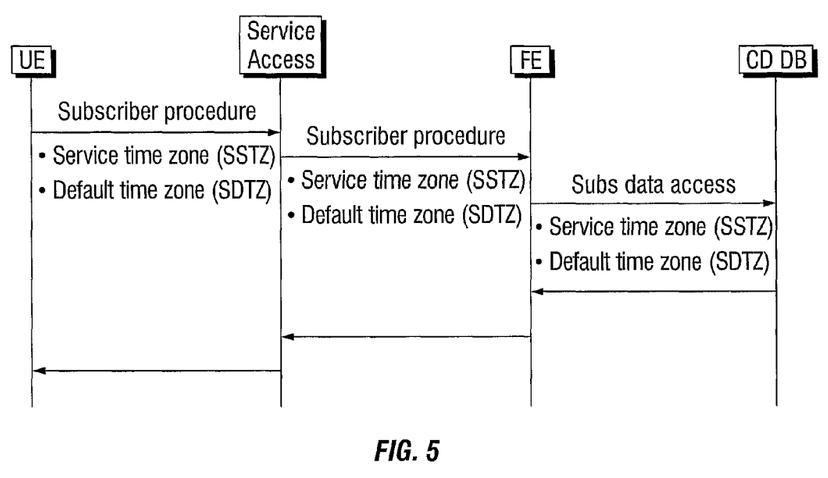
FIG. 5 shows the TZ set subscriber procedure.
Figure 6:
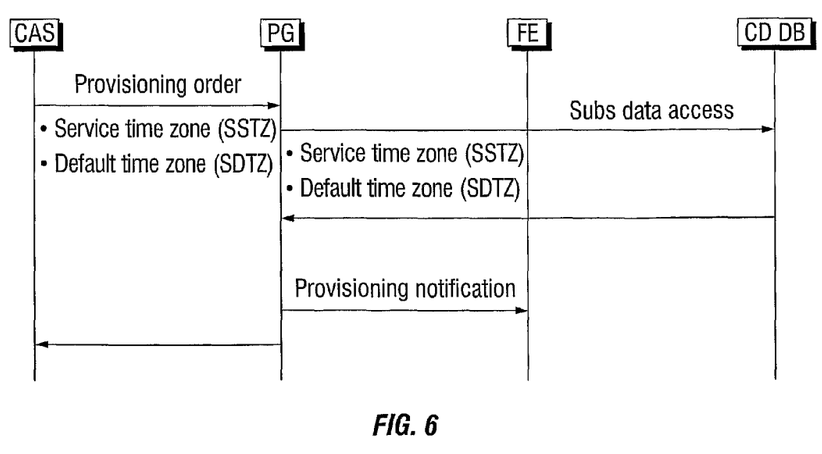
FIG. 6 shows the TZ set provisioning procedure.

In the Service Activation, the own Subscriber by means of subscriber procedures or the operator by means of provisioning procedures, would decide the TZ to be used for the service execution (FIGS. 5 and 6).

Subscriber Location TZ (SLTZ): based on the subscriber location.

Subscriber Default TZ (SDTZ): based on the reference time zone.

In this case, the Override Subscriber Location TZ flag (OSLFlag) would be set.

Subscriber Service TZ (SSTZ): based on the service.

In this case, the OSLFlag would be set, and a specific TZ would be included in the service activation.

Service Execution

When the Subscriber subscribes to the service or when any other traffic or O&M event trigger (100) the execution of the time dependant service the Service Control function (200) shall download the Subscriber Profile with the Subscriber Data from the CD (300), which contains among other things the SDTZ, the SSTZ, the SLTZ and the OSLFlag, see FIG. 2.

Figure 4:
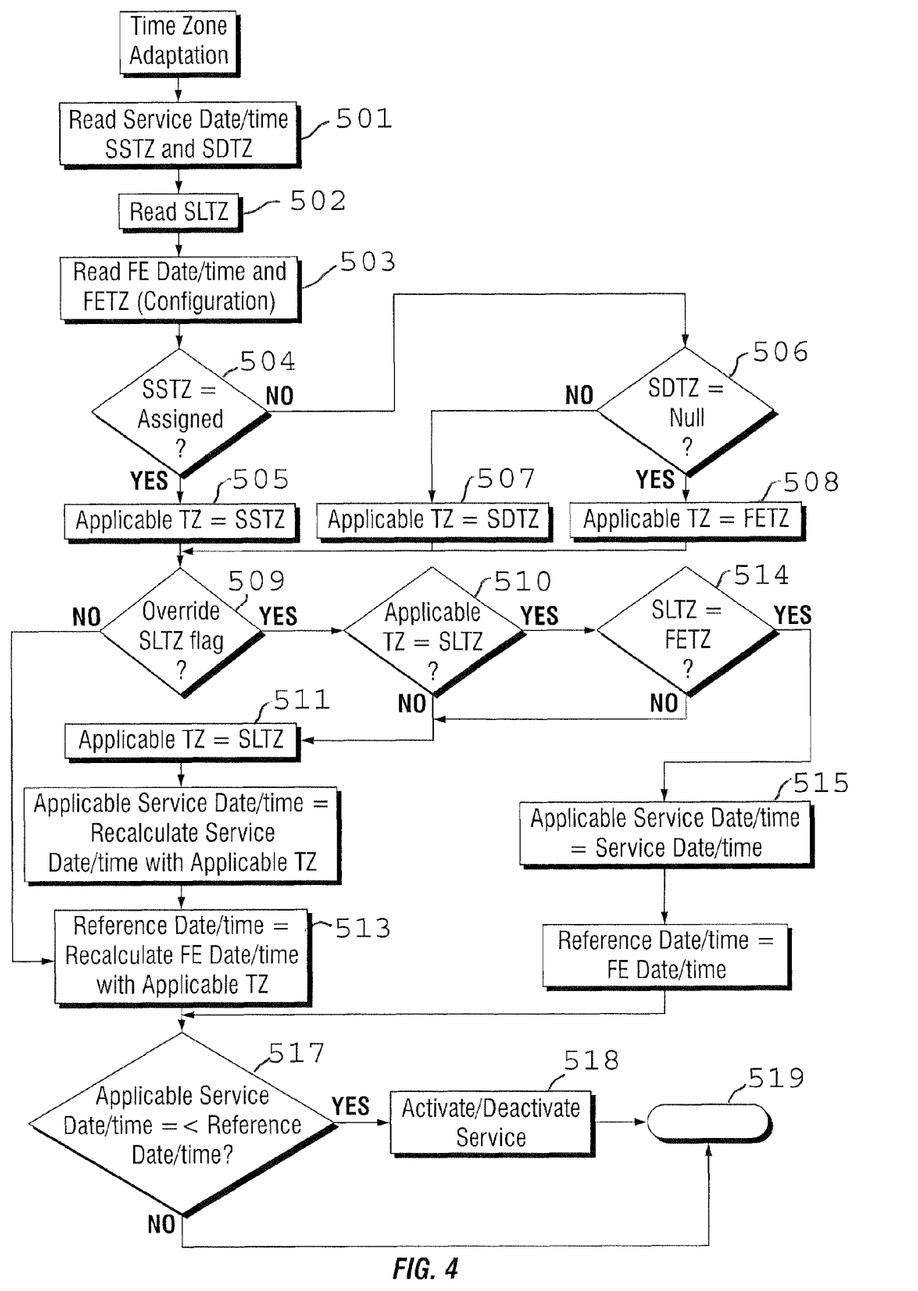
FIG. 4 shows the time calculation flow chart.

If the service is time related (400) the Server then call the Time Zone Adaptation procedure (500) described in FIG. 4 for calculating the proper date and time to be considered in the service execution according to the process described in FIG. 1, which takes into account the Subscriber Location Time Zone, Subscriber Service Time Zone, Subscriber Default Time Zone and 'Override Subscriber Location TZ flag' for the calculation of the time dependant service execution and follows with the remainder service logic.

Figure 3:
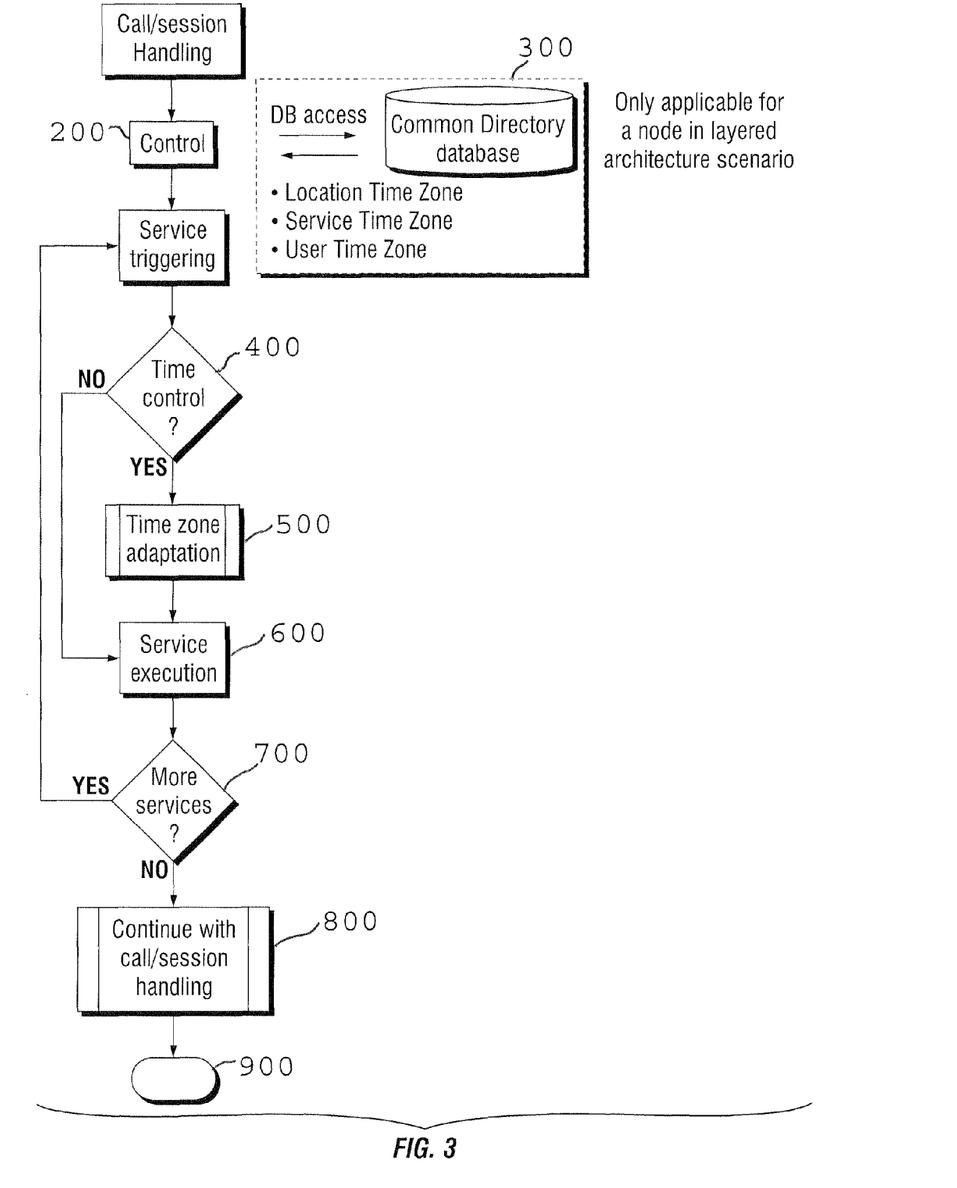
FIG. 3 shows the time dependent service execution flow chart.

Once the Time Zone Adaptation procedure (500) finishes, the service execution continues (600). If there are more pending services (700) they are treated by returning to the Service Control (200).

When no more services are pending, the call/session control is executed (800) and finished (900).

When the subscriber changes his/her location, it will trigger two events, SLTZ storage and time dependant service execution in order to recalculate the new date and time according the new subscriber location TZ.

Time Zone Adaptation function

The Applicable Service Date/Time is the date and time when the service shall be executed, namely the SAD and SAT. The Reference Date/Time is the current date and time. By comparing them it is possible to know whether the service shall be executed or not. The purpose of this procedure is the proper calculation of both.

When the Time Zone Adaptation is called (500), the first task is reading the various date and time information:
Service Date/Time, SSTZ, and SDTZ (501),
SLTZ (502), and
Front End Date/Time and FETZ (503).
Afterwards the Applicable TZ is selected according to following criteria:
If the SSTZ is assigned to the service (504) the Applicable TZ is set to SSTZ (505),
If the SSTZ is not assigned (504) and the SDTZ is not null (506), the Applicable TZ is set to SDTZ (507), or
If the SSTZ is not assigned (504) and the SDTZ is null (506), the Applicable TZ is set to FETZ (508).
Next step is to check the OSLTZ flag (509).
When the OSLTZ is not set, the Applicable TZ is the one selected in former steps (505), (507), and (508), The Applicable Service Date/Time is the Service Date/Time, but the Reference Date/Time (513) has to be set by recalculating the FE Date/Time according to the Applicable TZ.

When the OSLTZ is set, the Applicable TZ and the SLTZ are compared (510).

When the current Applicable TZ and SLTZ are different (510) the Applicable TZ is set to the SLTZ (511).

When the current Applicable TZ and SLTZ are equal (510) but different from the FETZ (514), the Applicable TZ is set to the SLTZ (511).

Subsequently the Applicable Service Date/Time (512) has to be set by recalculating the Service Date/Time according to the Applicable TZ. Additionally the Reference Date/Time (513) has to be set by recalculating the FE Date/Time according to the Applicable TZ.

When the current Applicable TZ, SLTZ (510), and FETZ (514) are equal the Applicable Service Date/Time and Reference Date/Time are set to the current Service Date/Time (515) and FE Date/Time (516) respectively.

Finally the Applicable Service Date/Time and Reference Date/Time are compared (517). When Applicable Service Date/Time is higher, the time for service execution is not yet reached and the procedure finishes (519). When the Reference Date/Time is equal or higher, the time for the service expired so the service shall be executed ((518) and finished (519).

Figure 7:
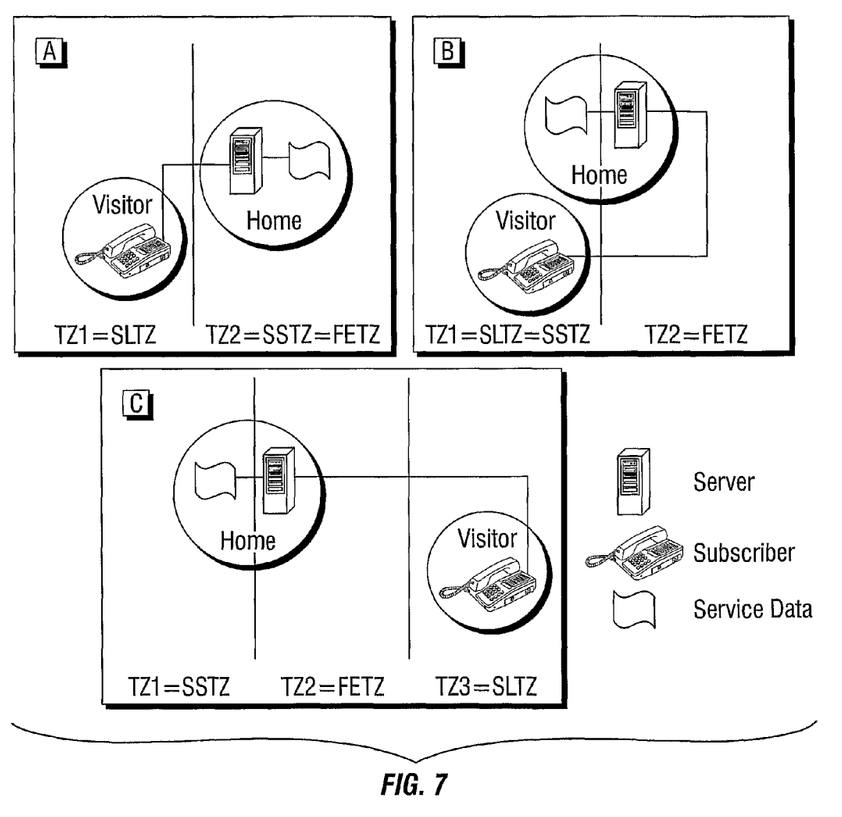
FIG. 7 shows scenarios where the time zone of the subscriber is different from the server.

FIG. 3 shows time dependent service execution flow.
FIG. 4 shows time calculation method.
FIG. 5 shows TZ set subscriber procedure.
FIG. 6 shows TZ set provisioning procedure.
FIG. 7 shows scenarios where the time zone of the subscriber is different from the server.
Prerequisites: Network covering several time zones, TZ1 and TZ2 or TZ1, TZ2 and TZ3.

Distributed Layered system where the Directory DB is geographical separated from the Servers, and the physical entities are distributed among the time zones.

The time dependent service data has time configured related to a time zone, SSTZ.

The Server (executing the service) is placed in time zone FETZ.

The Subscriber in located in a time zone SLTZ.

a) The Subscriber is in a location with a different time zone than the Server and Service data (FETZ=SSTZ, SLTZ and FETZ are different). This case can be possible for example when the Subscriber is roaming in a visitor network with a different time zone than the home network, and the Server and Service data are referred to the same time zone.

b) The Server has a different time zone than the Subscriber and Service data (SLTZ=SSTZ, SLTZ and FETZ are different). This case can be possible when the Subscriber is located in the same time zone which the Service data refers to but the Server executing the service is in another time zone.

c) The time zones of the Subscriber, Server and Service data are different (SLTZ, FETZ, and SSTZ are different). This case can be possible when the Subscriber is located in a visitor network in a different time zone that server and also different from the time zone of the Service data.

IMSI Changeover (A Specific Case)

Figure 8:
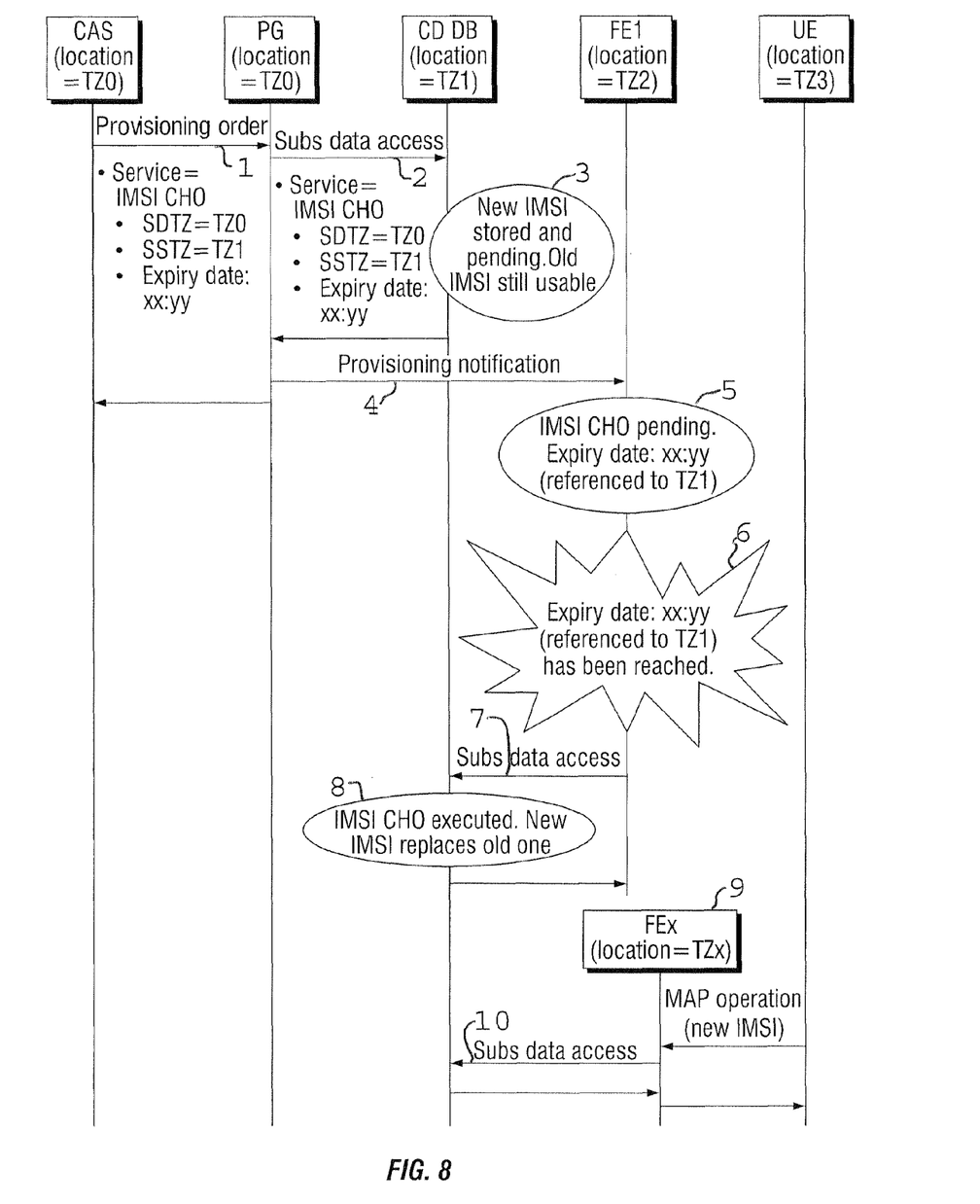
FIG. 8 shows the IMSI Changeover procedure.

Referring to FIG. 8, IMSI Changeover functionality is an example of functionality that has timers to be activated in a given time.

Considering for example the scenario a) in FIG. 7, the activation of the service might happen according to TZ2 (according to the FETZ/SSTZ) or might happen according to TZ1 (according to the SLTZ) depending on the FE 10 logic.

If it uses TZ1, the activation of the functionality is made based on the subscriber location, but really the service has been ordered by the operator based on the SSTZ.

Depending on the case, the service could have a:
Late execution, in case the service is executed after the specified time.
Early execution, in case the service is executed before the specified time.
The same happens with the scenarios b) and c), where we have different TZ's and we could decide to use any of them to check the execution time.

If the operator follows the method provided in the invention, he would decide exactly which is the time to be used during the service activation, for example specifying the SSTZ (the operation must be executed on base to the service) or specifying the SLTZ (the operation must be executed on base to the subscriber location).

The next flow shown in FIG. 8 describes one specific case where, for example, the operator (1) through the PG (2) has set SSTZ for an IMSI Changeover service (3). The PG then notifies (4) the FE 10 about the service. The FE 10 sets the service as pending (5). At that point the proper date and time are set according to the procedure of this invention. During the execution of this time dependant service SSTZ, FETZ and SLTZ will correspond to different TZs (scenario c) in FIG. 7.

When the Service Date and Time expires (6), the FE update the CD (7) with the new IMSI which replaces the old one (8). New traffic events in any FE (9) use the new IMSI from then on, also applicable to the access to CD (10).

This invention enhances the known procedures for executing time based services where different network entities involved belong to different TZs. It that sense, this invention provides:
Decoupling of service TZ and physical FE 10, which executes the service, TZ.

General purpose procedure for time calculation independently of the serving FE 10 Server location and Subscriber location TZs.

Support of not only monolithic architectures but also layered, where service data and logic are decoupled, so the logic can run in different deployments once the service data of the Subscriber is fetched from the Directory DB.

TZ Service and Subscriber data consolidation in the Common Directory DB.

Multicountry support for services depending on timing.

This ID covers not only CS/PS but also other networks like, IMS, fixed, fixed-mobile convergence.

IMSI CHO

IMSI ChangeOver (IMSI CHO) functionality can be activated at a certain date and time. Therefore, these data, (date and time), must be stored in the system data base to be consulted by the system logic to activate the functionality at certain specific moment.

IMS SS-CFx

By IMS SS-CFx we are referring to all "Call Forwarding" services inside IMS. However, only such SS-CFx services with a time specified are of interest of this invention.

That is all calls to a number are diverted to another from a given time until another deactivation time.

Abbreviations
CAS Customer Administration System
CD Common Directory
CDTZ CD Time Zone
CHO Change Over
CS Circuit Switched
DB Database
FE Front End
FETZ FE Time Zone
IMSI International Mobile Subscriber Identity
MAP Mobile Application Part
OSLFlag Override Subscriber Location Flag
PS Packet Switched
SDTZ Subscriber Default TZ
SLTZ Subscriber Location TZ
SSTZ Subscriber Service TZ
TZ Time Zone Although the invention has been described in detail in the foregoing embodiments for the purpose of illustration, it is to be understood that such detail is solely for that purpose and that variations can be made therein by those skilled in the art without departing from the scope of the invention except as it may be described by the following claims.

The invention claimed is:

1. A front end (FE) server of a data layered architecture (DLA) system, the DLA system including a common directory (CD) of subscriber data in a telecommunications network, comprising:
a processing unit which defines an FE time zone (FETZ) based on the FE server's geographical location and that defines a current date and time of the FETZ;
a network interfacing unit which obtains from the CD through the network:
a subscriber default time zone (SDTZ), which defines a default reference time zone for the subscriber;
a subscriber service time zone (SSTZ), which defines a time zone in which the subscriber service is executed; and
a service activation date (SAD) and a service activation time (SAT), which define date and time to execute the service with reference to a service time zone (STZ);
wherein the processing unit selects as the STZ for executing the service according to the following hierarchy:
the SSTZ, if a valid SSTZ exists,
the SDTZ, if a valid SSTZ does not exist, or
the FETZ, if a valid SDTZ does not exist; and
wherein the processing unit only executes the service after checking that the SAD and SAT of the STZ correspond to the current date and time of the FETZ.

2. The FE server of claim 1, wherein the network interfacing unit also obtains from the CD through the network a subscriber location time zone (SLTZ) and an override subscriber location flag (OSLFlag) forcing the processing unit to select the SLTZ as service time zone (STZ) for executing the service.

3. The FE server of claim 2 wherein the processing unit recalculates a new SLTZ when there is a new subscriber location time zone and sends it to the CD.

4. The FE server of claim 1 wherein the network interfacing unit receives a subscriber procedure request message from a Service Access Element which changes the SSTZ.

5. The FE server of claim 1 wherein the processing unit comprises a time zone adaptor for converting the SAD and SAT of the STZ into a corresponding date and time of the FETZ;
and wherein the processing unit only executes the service after checking that the corresponding date and time of the FETZ respectively match the current date and time of the FETZ.

6. The FE server of claim 1 wherein the processing unit comprises a time zone adaptor for converting the current date and time of the FETZ into a corresponding date and time of the STZ; and wherein the processing unit only executes the service after checking that the corresponding date and time of the STZ respectively match the SAD and SAT of the STZ.

7. A Common Directory (CD) of a data layered architecture (DLA) system, the DLA system including a front end (FE) server in a telecommunications network, comprising:
a memory which stores:
a subscriber default time zone (SDTZ), which defines a default reference time zone for the subscriber;
a subscriber service time zone (SSTZ), which defines a time zone in which the subscriber service is executed; and
a service activation date (SAD) and a service activation time (SAT), which define date and time to execute the service with reference to a service time zone (STZ); and
a network interfacing unit which sends the subscriber default time zone (SDTZ), the subscriber service time zone (SSTZ), the service activation date (SAD) and the service activation time (SAT) towards the FE server for use in selecting the STZ according to a selection hierarchy configured in the FE server.

8. The CD server of claim 7 wherein the network interfacing unit receives a notification from a provisioning gateway which changes at least one of the SSTZ and SDTZ.

9. A method of a front end (FE) server of a data layered architecture (DLA) system, the DLA system including a common directory (CD) of subscriber data in a telecommunications network, comprising:
defining with a processing unit an FE time zone (FETZ) based on the FE server's geographical location and a current date and time;
obtaining with a network interfacing unit from the CD through the network:
a subscriber default time zone (SDTZ), which defines a default reference time zone for the subscriber, a subscriber service time zone (SSTZ), which defines a time zone in which the subscriber service is executed; and a service activation date (SAD) and a service activation time (SAT), which define date and time to execute the service with reference to a service time zone (STZ);

the processing unit selecting as the STZ for executing the service according to the following hierarchy:
the SSTZ, if a valid SSTZ exists,
the SDTZ, if a valid SSTZ does not exist, or
the FETZ, if a valid SDTZ does not exist; and the processing unit only executing the service after checking that the SAD and SAT of the STZ correspond to the current date and time of the FETZ.

10. The method of claim 9 including the step of the network interfacing unit also obtaining from the CD through the network a subscriber location time zone (SLTZ) and an override subscriber location flag (OSLFlag) forcing the processing unit to select the SLTZ as service time zone (STZ) for executing the service.

11. The method of claim 10 including the steps of the processing unit recalculating a new SLTZ when there is a new subscriber location time zone and sending the new SLTZ from the network interfacing unit to the CD.

12. The method of claim 9 including the step of the network interfacing unit receiving a subscriber procedure request message from a Service Access Element which changes the SSTZ.

13. The method of claim 9 including the steps of: a time zone adaptor converting the SAD and SAT of the STZ into a corresponding date and time of the FETZ, and the processing unit only executing the service after checking that the corresponding date and time of the FETZ respectively match the current date and time of the FETZ.

14. The method of claim 9 including the steps of: a time zone adaptor converting the current date and time of the FETZ into a corresponding date and time of the STZ, and the processing unit only executing the service after checking that the corresponding date and time of the STZ respectively match the SAD and SAT of the STZ.

15. A method of a Common Directory (CD) of a data layered architecture (DLA) system, the DLA system including a front end (FE) server of in a telecommunications network, comprising:

receiving a subscriber profile request from the FE by way of the network at a network interfacing unit; and sending from the interfacing unit to the FE by way of the network:
a subscriber default time zone (SDTZ), which defines a default reference time zone for the subscriber;
a subscriber service time zone (SSTZ), which defines a time zone in which the subscriber service is executed; and
a service activation date (SAD) and a service activation time (SAT) which define date and time to execute the service with reference to a service time zone (STZ) for use by the FE server in selecting the STZ according to a selection hierarchy configured in the FE server.

16. The method CD server of claim 15 including the step of the network interfacing unit receiving a notification from a provisioning gateway which changes the SSTZ.

* * * * *

UNITED STATES PATENT AND TRADEMARK OFFICE
CERTIFICATE OF CORRECTION

PATENT NO. : 8,660,252 B2  
APPLICATION NO. : 13/516387  
DATED : February 25, 2014  
INVENTOR(S) : Mateos Perez et al.

Page 1 of 2

It is certified that error appears in the above-identified patent and that said Letters Patent is hereby corrected as shown below:

In the Drawings:

In Fig. 3, Sheet 2 of 7, delete "  " and insert --  --, therefor.

In Fig. 4, Sheet 3 of 7, delete "  " and insert --  --, therefor.

In Fig. 4, Sheet 3 of 7, delete "  " and insert --  --, therefor.

In Fig. 4, Sheet 3 of 7, delete "  " and insert --  --, therefor.

In Fig. 4, Sheet 3 of 7, delete "  " and insert --  --, therefor.

In the Specification:

Signed and Sealed this  
Fifth Day of August, 2014

Michelle K. Lee  
*Deputy Director of the United States Patent and Trademark Office*

CERTIFICATE OF CORRECTION (continued)
U.S. Pat. No. 8,660,252 B2

In Column 1, Line 10, delete "conents" and insert -- contents --, therefor.

In Column 3, Line 53, delete "THE THE DRAWINGS" and insert -- THE DRAWINGS --, therefor.

In Column 7, Line 58, delete "((518)" and insert -- (518) --, therefor.

In the Claims:

In Column 12, Line 29, in Claim 16, delete "CD" and insert -- of CD --, therefor.